Sept. 20, 1971     R. POSNER     3,605,181
SPLIT-FACE MOLD WITH PLUNGER
Filed March 12, 1970
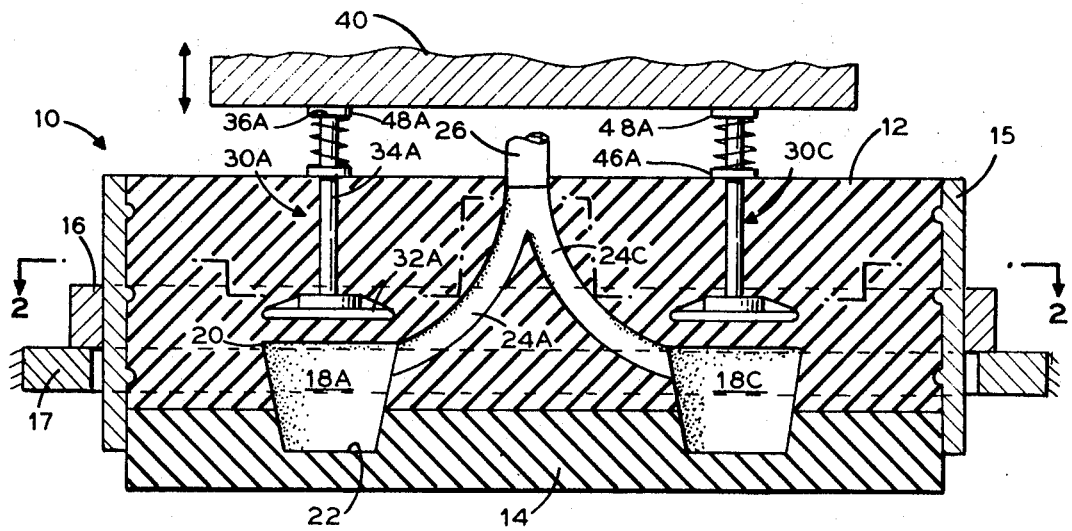
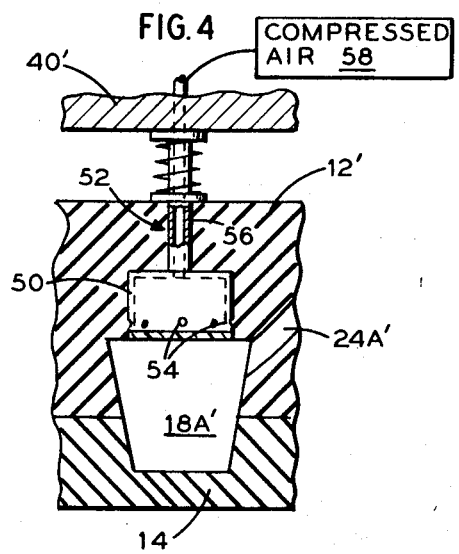
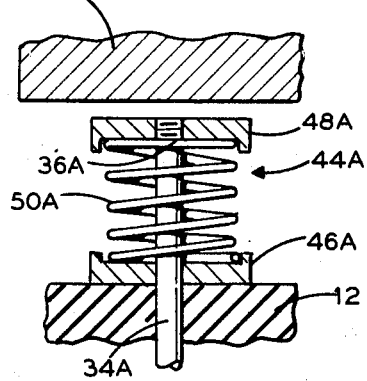
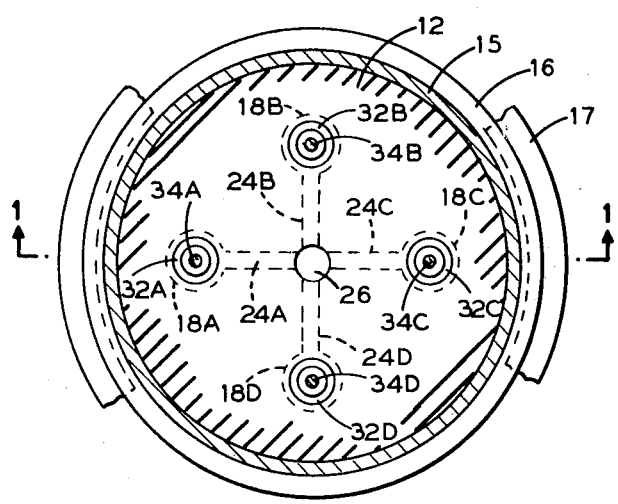
INVENTOR.
Richard Posner
BY *Hane, Baxley and Spiecens*
ATTORNEY United States Patent Office 3,605,181
Patented Sept. 20, 1971

3,605,181
SPLIT-FACE MOLD WITH PLUNGER
Richard Posner, East Northport, N.Y., assignor to Creative Polymer Products Corp., Long Island City, N.Y.
Filed Mar. 12, 1970, Ser. No. 18,880
Int. Cl. B29c 7/00
U.S. Cl. 18—2RC                                        7 Claims

ABSTRACT OF THE DISCLOSURE

A split-face mold includes at least one section of elastomeric material. Within this section is at least a portion of the mold cavity. Also, within this section is a rigid plunger with a face plate opposite the mold cavity and a shaft that extends away from the mold cavity to the outside of the mold section. The plunger is used to force molded articles out of the mold cavity.

---

This invention pertains to molds and, more particularly, to molds made of elastomeric materials.

In my copending application for Method of Making a Mold, filed Nov. 25, 1968, Ser. No. 784,998, I disclosed a method of making molds from elastomeric materials. Such molds are extremely versatile and have created a demand for even better molds. In particular, such molds because of the easy flow properties of the initially unpolymerized elastomers that form the molds could form mold cavities for articles with deep undercuts. Furthermore, because of the resiliency of the polymerized elastomers of the final mold, the mold sections could be temporarily deformed to remove the molded article from the cavity. However, there was some difficulty in prying the molded article from the cavity.

It is, accordingly, a general object of the invention to provide an improved mold of the type described above which permits the easy removal of deep undercut molded articles from the mold cavities.

Briefly, the invention contemplates a split-free mold comprising two mold sections. At least one of the mold sections is made of an elastomeric material such as a natural or synthetic rubber. There is within at least this mold section a mold cavity. Also, fixed within this section there is a rigid plunger. The rigid plunger has a face plate opposite the mold cavity and a shaft that extends away from the mold cavity to the outside of the mold section.

Other objects, the features and advantages of the invention will be apparent from the following detailed description when read with the accompanying drawing wherein:

FIG. 1 shows a radial cross-section taken along the line 1—1 of FIG. 2 of the mold of the invention;

FIG. 2 is a cross-section, scaled down, along the line 1—1 of the mold of the invention;

FIG. 3 shows the details of the plunger of the mold of FIGS. 1 and 2; and

FIG. 4 shows in cross-section another embodiment of the plunger of the mold.

The mold 10 shown in FIGS. 1 and 2 is of the split-face type having mold sections 12 and 14. Mold section 12 is made from an elastomeric material such as a natural or synthetic rubber. Surrounding mold section 12 is a metal collar 15 to which are connected studs 16 for abutting against fixed posts 17. Within mold section 10 are mold cavities 18A to 18D. It should be noted that the cross-sectional dimension of the rear 20 of a typical mold cavity 18A is less than the cross-sectional dimension of the mouth 22 of cavity 18A. Runners 24A to 24D connect mold cavities 18A to 18D, respectively, to central filling sprue 26.

In a typical operation, molding resin is fed into sprue 26 to fill the mold cavities. When the resin has set, the mold is opened by removing mold section 14. However, the molded pieces in the cavities cannot drop out because of the undercut.

In order to solve this problem, there is embedded in mold section 12 a plurality of plungers 30A to 30D of a rigid material such as steel, i.e., one per mold cavity. A typical plunger 30A comprises a face plate 32A, opposite the rear of mold cavity 18A, and a shaft 34A connected to face plate 32A. Shaft 32A extends upward and away from mold cavity 18A to terminate at an end 36A external to mold section 12. Opposite the ends 36 of the shafts 34 is an abutment member 40 connected to a reciprocating drive means (not shown). Now, when mold section 14 is removed, abutment member 40 is driven downward driving mold section 12 and collar 15 downward. However, this downward motion of the mold section and collar is stopped by studs 16 engaging posts 17. Thereafter, the plungers 30 continue to follow the downward motion of the abutment member 40 and face plates 32 thereof transmit a downward force to the molded articles in the cavities 18 until these articles are expelled. Thereafter, member 40 retracts.

To insure that the plungers 30 also retract, it is desirable to include a spring biasing means at the end of each plunger. A typical spring biasing means 44A is shown at the end 36A of plunger 30A in FIG. 3. In particular, means 44A comprises a washer 46A slidably disposed about shaft 34A and resting on mold section 12, a washer 48A pinned to the end of shaft 34A, and a helical spring 50A under compression between the two washers. Thus, in the absence of pressure from abutment member 40, spring 50A retracts plunger 30A.

A variation of the plunger is shown in FIG. 4, which can be used to free the molded articles and blow them to a collecting bin. Since many elements are the same as previously described elements, primed reference characters will be used for like elements and only the differences will be cited. More specifically, the face plate 50 of plunger 52 forms a portion of the wall defining mold cavity 18A'. In addition, face plate 50 is provided with a plurality of conduits 54 that communicate with hollow shaft 56 of the plunger. The hollow shaft 56 is coupled to a source of compressed air 58. Thus, when member 40' presses downward to expel the molded article, the openings of conduits 54 enter the mold cavity 18A'. At that time, a pulse of compressed air is delivered to shaft 56 and the molded article is blown toward a collection bin.

Of course, it should be realized that the invention is preferably incorporated in an automated assembly line wherein the filling of the mold, the parting of the mold sections and the operation of abutment member 40 are synchronized to occur serially. Furthermore, although the operation has been described with abutment member 40 performing the reciprocating movement, it is also contemplated that mold section 12 can perform the reciprocating movement.

While only one embodiment of the invention has been shown and described in detail, there will now be obvious to those skilled in the art many modifications and variations satisfying many or all of the objects of the invention but which do not depart from the spirit thereof as defined in the appended claims.

What is claimed is:

1. A split-face mold comprising two mold sections positionable in face-to-face relation, at least a first of said mold sections being of an elastomeric material, a mold cavity at least in said first mold section, and a plunger of rigid material fixed in said first mold section, said plunger having a face plate in said first mold section opposite said mold cavity and a shaft extending away from said mold cavity and prolonged to extend outward from said first mold section.

2. The mold of claim 1 further comprising spring biasing means for urging said plunger in a direction away from said mold cavity.

3. The mold of claim 1 further comprising an abutment means disposed opposite the end of said plunger external to said first mold section and wherein said first mold section and said abutment means are reciprocatingly movable toward and away from each other.

4. The mold of claim 3 further comprising spring biasing means for urging said plunger in a direction away from said mold cavity.

5. The mold of claim 1 wherein a surface of the face plate of said rigid plunger defines a portion of the mold cavity.

6. The mold of claim 5 further comprising means for applying compressed air to the portion of said mold cavity in the region of said face plate.

7. The mold of claim 6 wherein said compressed air applying means comprises a tubular passageway through said plunger and ducts within said face plate communicating with said tubular passageway.

References Cited

UNITED STATES PATENTS

| | | | |
|---|---|---|---|
| 2,582,922 | 1/1952 | Crowley et al. | 18—RMD |
| 2,658,237 | 11/1953 | Cuppett et al. | 18—RMD |
| 2,714,226 | 8/1955 | Axelrod | 18—MD |
| 2,860,376 | 11/1958 | Graves et al. | 249—67X |
| 2,916,771 | 12/1959 | Lang et al. | 18—RMD |
| 2,929,105 | 3/1960 | Starck et al. | 18—2RCX |
| 3,377,653 | 4/1968 | Buonianto | 18—2RDX |
| 3,362,046 | 1/1968 | Blumer | 18—2RDX |
| 3,498,581 | 3/1970 | Judson | 249—67 |

J. HOWARD FLINT, Jr., Primary Examiner

U.S. Cl. X.R.

249—67; 18—rubber mold dig